United States Patent

Bargelé et al.

[11] Patent Number: 5,618,230
[45] Date of Patent: Apr. 8, 1997

[54] DEVICE FOR CUTTING UP WINGS OF POULTRY BODIES

[75] Inventors: Norbert Bargelé, Stockelsdorf; Manfred Brandt; Andreas Landt, both of Lübeck; Marek Szymanski, Kleinmeinsdorf, all of Germany

[73] Assignee: Nordischer Maschinenbau Rud. Baader GmbH & Co. KG, Lubeck, Germany

[21] Appl. No.: 581,963

[22] Filed: Jan. 2, 1996

[30] Foreign Application Priority Data

Jan. 3, 1995 [DE] Germany .................. 195 00 014.5

[51] Int. Cl.⁶ .................................................. A22C 21/00
[52] U.S. Cl. ........................... 452/169; 452/165; 452/170
[58] Field of Search ................................ 452/169, 166, 452/165, 170

[56] References Cited

U.S. PATENT DOCUMENTS 4,827,570 5/1989 Scheoer et al. ................... 452/169
4,920,610 5/1990 Callsen et al. .................... 452/169
4,935,990 6/1990 Linnenbank ..................... 452/109
4,993,111 2/1991 Martin et al. .................... 452/169
5,106,334 4/1992 Kristinsson ....................... 452/165
5,176,564 1/1993 Hazenbroek ..................... 452/169
5,188,560 2/1993 Hazenbroek ..................... 452/169
5,411,434 5/1995 McGoon et al. ................. 452/169
5,496,210 3/1996 Davis ............................... 452/169

Primary Examiner—Willis Little
Attorney, Agent, or Firm—Fay, Sharpe, Beall, Fagan, Minnich & McKee

[57] ABSTRACT

A device for cutting up the wings of poultry bodies into their component parts is described. The device comprises a saddle conveyor for receiving the poultry bodies in the form of front halves with wings. The wings are engaged and synchronously accompanied by auxiliary conveyors and guided into a guide system where they are cut up by means of "anatomic" cuts, i.e. cuts running through the joints. The device is adapted to by integrated into a processing line for filleting breast meat or the like.

12 Claims, 2 Drawing Sheets

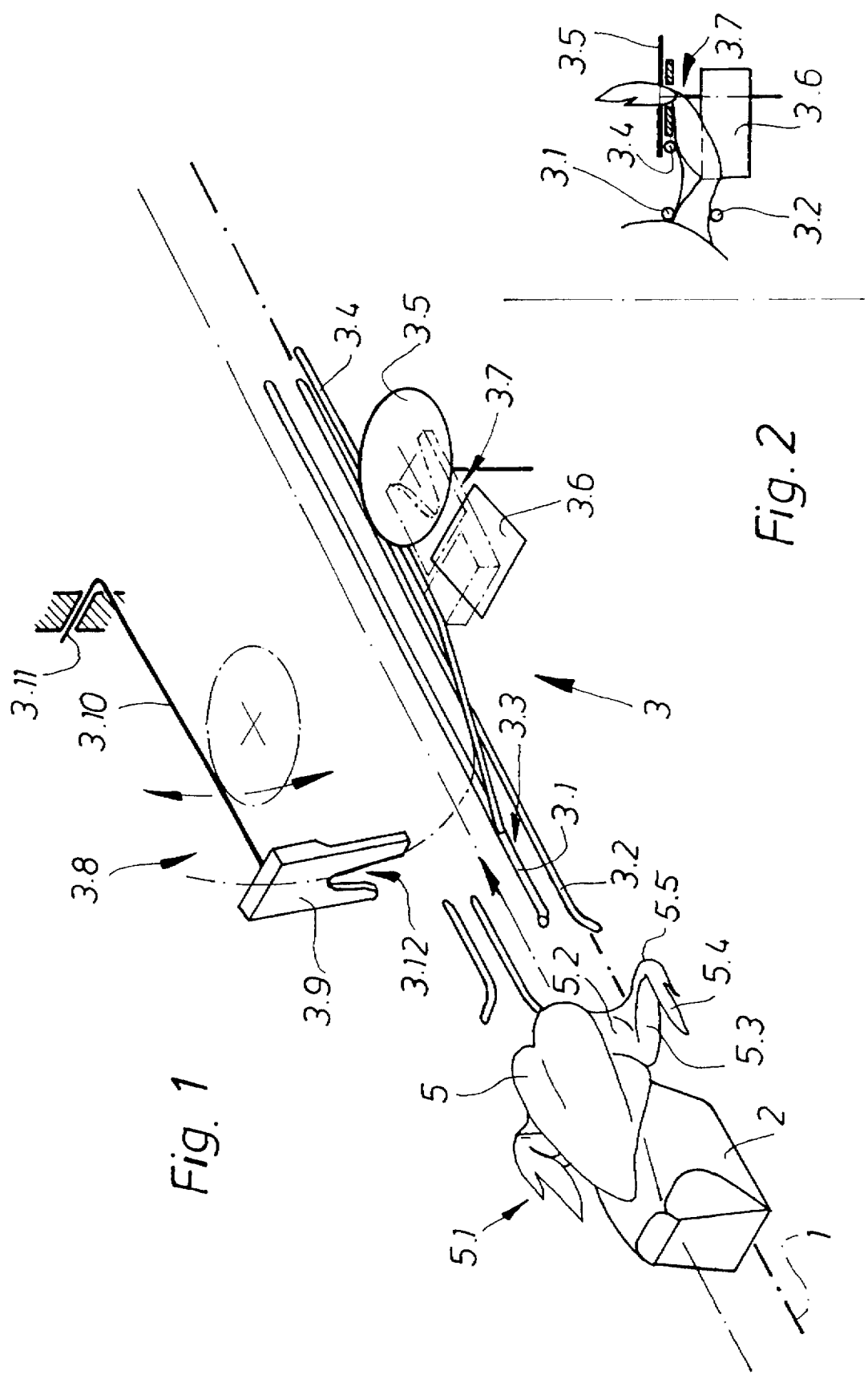

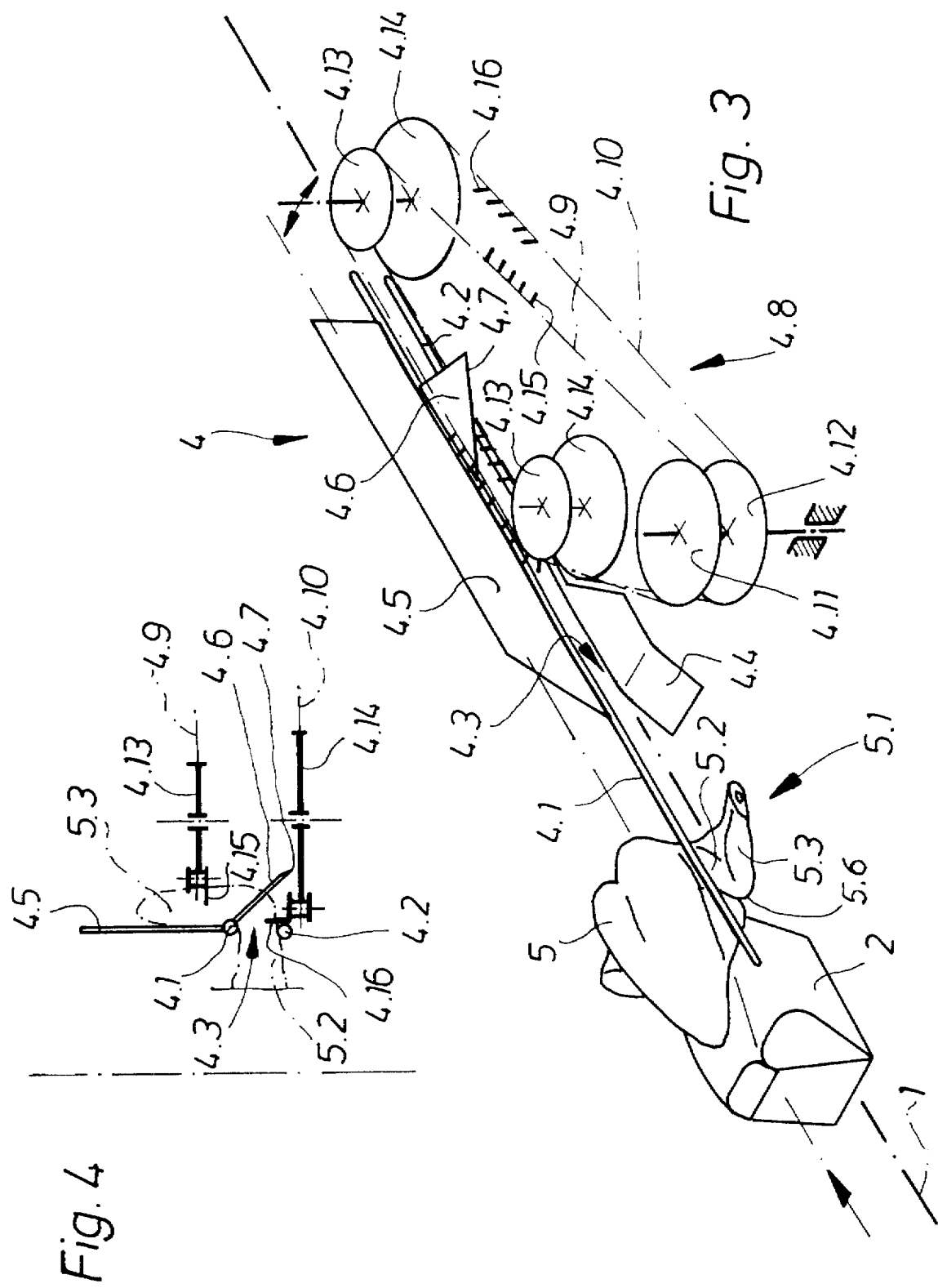

5,618,230

DEVICE FOR CUTTING UP WINGS OF POULTRY BODIES

BACKGROUND OF THE INVENTION

1. Field of the Invention

The invention concerns an apparatus for cutting the wings of poultry bodies into their individual elements.

2. Prior Art

A device for severing a single joint in a poultry wing is known from U.S. Pat. No. 5,188,560. This device comprises two circular knives, which are arranged symmetrically on either side of the path of the poultry bodies in a V-shape. The poultry bodies arrive at this device hanging from their foot joints which are held by shackles of an overhead conveyor and guided by means of guides at the level of the wing axilla such that the wrist of the wing lies in the cutting plane of the circular knives.

The cut is effected through the wing wrist joint from the crook of the joint outwards.

Furthermore, a device for removing the lower wing is known from U.S. Pat. No. 5,176,564. In this device the poultry bodies are again transported while hanging from the foot joints. The poultry bodies arrive at the cutting device, which consists of two circular knives oriented to form a V and are guided such that the wing elbows are guided against the circular knives and divided from the crook of the joint outwards.

On cutting up the wing, it is important that the cuts anatomically run true, i.e. that specifically with regard to a division in the region of a joint, they are guided to follow the natural dividing plane of the joint connections.

It is also highly desirable that the precision of a dividing cut is largely independent of the size of the poultry bodies being processed.

3. Objects of the Invention

It is thus an object of the invention to provide an apparatus for cutting up wing joints into its individual component parts wherein the guidance and orientation of the wing is controlled precisely to enable a severing cut to be made in an anatomically suitable manner.

A further object of the invention is to provide an apparatus capable of operating reliably and accurately irrespective of the size of the poultry bodies to be processed.

SUMMARY OF THE INVENTION

These objects are achieved in an apparatus for cutting up the wings of poultry bodies into their component parts by providing conveyor means for advancing the poultry bodies in their plane of symmetry, guides arranged on either side of the path of the poultry bodies for guiding the wings, auxiliary conveyor means for supporting the wing during its severance and severing means for carrying out severing cuts through the wing joints.

The advantages achievable with an apparatus of this type are that even wings of less defined structure can be cut up expediently since they are presented to the severing means precisely orientated, while a decisive advantage is that the alignment of the poultry during the severing operation is securely maintained.

In a preferred embodiment of the apparatus for processing wings, whereby the wings are still connected to the so-called front half of the poultry body, which are obtained by dividing the poultry body transversly through the backbone to separate the wings and the legs, the conveying means for advancing the front halves can be provided as a saddle conveyor, each front half being mounted cap-like on its own saddle.

BRIEF DESCRIPTION OF THE DRAWINGS

Other objects of the present invention will become apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a simplified perspective view of an apparatus for removing the wing tip members of poultry bodies;

FIG. 2 shows a section through the operating area of the apparatus of FIG. 1;

FIG. 3 shows a simplified perspective view of an apparatus for removing the lower wings members from poultry bodies; and FIG. 4 shows a section through the operating area of the apparatus of FIG. 3.

DETAILED DESCRIPTION OF THE PREFERRED EMBODIMENTS

In a non-illustrated frame of a poultry processing machine, which may for example be for obtaining breast meat, there is arranged an endless circulating conveyor 1, driven in a suitable manner and carrying saddles 2 for receiving poultry bodies 5 to be processed. The conveyor 1 describes with its upper run a processing path, which is flanked with processing devices 3, 4 for cutting off the wing tip members 5.4 and the lower wing members 5.4, respectively.

The first processing device 3 for cutting off the wing tip members 5.4 comprises two apparatus parts symmetrically arranged one on each side of the processing path. Each apparatus part comprises a system of guides in accordance with FIGS. 1 and 2, the guides essentially comprising two guide rails 3.1, 3.2, which are arranged one above the other, at the level of the path of the saddles 2 and running parallel with the processing path. The guide rails 3.1, 3.2 are separated by a gap 3.3, which is designed to guide the upper wing 5.2 such that the guide rails 3.1, 3.2 engage the body adjacent the wing-body joint. The upper guide rail 3.1 comprises a lateral guide 3.4, which when viewed in the conveying direction is arranged initially to diverge and then to run essentially parallel with the processing path and roughly at the level of the upper guide rail 3.1. A circular knife 3.5 suitably driven when to rotate in a horizontal plane is arranged directly above the guide 3.4 to overlap the same from the outside. A flat supporting guide 3.6 is associated with the circular knife 3.5 below that part of the latter's cutting edge directed counter the conveying direction and is arranged spaced from the underside of the knife 3.5 by a gap 3.7.

Furthermore, an auxiliary conveyor 3.8 with an entrainer 3.9 is arranged adjacent the path of the conveyor 1. The entrainer 3.9 is attached to the free end of a pivot lever 3.10, which is pivotally mounted about an axis 3.11 lying above the path of the saddle 2 and extending tranverse to the same in a horizontal plane. The arrangement of the entrainer 3.9 with respect to the circular knife 3.5 is such that in the lowest swing position of the entrainer 3.9, which also corresponds to its end position, it enters the gap 3.7 between the circular knife 3.5 and the supporting guide 3.6, i.e. it slips below the circular knife 3.5. The entrainer 3.9 has the form of a forked foot with a V-shaped recess 3.12, which partially encompasses the axis of the circular knife 3.5 when the entrainer is in its end position. The movement of the pivot lever 3.10 transmitted via suitable non-shown gearing is dependent on the position of the saddle 2 along the conveyor 1, the starting position, the pivoting speed profile and the time of return pivot being matched to the conveyor 1.

The operation of the first processing device 3 is as follows. A poultry front half 5 with wings 5.1 is mounted cap-like as shown in FIG. 1 on the leading part of the saddle 2 with the breast facing upwards and is advanced by the conveyor 1 to initially arrive in the region of the upper and lower guide rails 3.1 and 3.2, where the wings 5.1 slip between these rails into the gap 3.3 so that the upper wing 5.2 is guided close to the body. As the poultry body is advanced further, the guide 3.4 comes into operation to provide additional support for the lower wing 5.3. During this process, the entrainer 3.9 is held in the upper pivot position so that the poultry body 5 may be advanced unhindered. When the saddle 2 reaches a predetermined position, the entrainer 3.9 is activated by an anticlockwise pivotal movement such that it eventually follows and supports the wing 5.1, while the recess 3.12 surrounds the wing tip 5.4 in the area of the joint 5.5 between the lower wing and wing tip members 5.3, 5.4. The correct positioning is finally guaranteed shortly before the poultry body 5 arrives at the circular knife 3.5 in that the lower wing 5.3 runs up onto the support guide 3.6 and is thereby pressed against the underside of the entrainer 3.9. The severing cut carried out in this position thus runs directly through the region of the wing tip joint. The lower wing member 5.3 is subsequently freed as it passes over the support guide 3.6 so that after this process the poultry body can advance further unhindered. Immediately after the wing tip 5.4 is removed, the entrainer 3.9 is pivoted back into its starting position ready for processing the next poultry body.

A second processing device 4 for removing the lower wing 5.3 is connected downstream of the above-described first processing device 3. This device also comprises two apparatus parts arranged symmetrically one on either side of the processing path. Each apparatus part comprises a system of guides in accordance with FIGS. 3 and 4, the guides essentially including two guide elements 4.1 and 4.2 arranged one above the other and extending adjacent the path of the saddles 2 and essentially parallel to the same. The upper guide element 4.1 may be an extension of the upper guide rail 3.1 of the first processing device 3. A gap 4.3 is provided between the upper and lower guide elements 4.1, 4.2 for guiding the upper wing 5.2 such that the guide elements 4.1, 4.2 engage the wing close to the wing joint on the body. The end of the lower guide element 4.2 directed towards the oncoming poultry bodies is provided with a flat ramp guide 4.4 for supporting the upper wing members 5.2. The upper guide element 4.1 forms the lower edge of a vertically extending slidng guide 4.5 and is provided with a laterally projecting knife blade 4.6 arranged inclined downwards at an angle of approximately 45° to the horizontal. The knife blade 4.6 has a cutting edge 4.7 which diverges with respect to the guide element 4.2 in the conveying direction.

An auxiliary conveyor 4.8 is arranged beside the conveyor 1 to run parallel with the processing path. The auxiliary conveyor 4.8 comprises two endless chain conveyors 4.9 and 4.10, which are driven synchronously with the conveyor 1 to run in horizontal planes, one above the other. Each chain conveyor 4.9, 4.10 is guided around a driving wheel 4.11, 4.12 and two freely rotating idler wheels 4.13, 4.14, respectively. The chain conveyors 4.9, 4.10 are arranged in such a way that each comprises a working run extending parallel to the sliding guide 4.5 and the upper and lower guide elements 4.1 and 4.2. Both chain conveyors 4.9, 4.10 are equipped with spikes 4.15, 4.16, the spikes 4.15 of the upper chain conveyor 4.9 pointing horizontally outwards and the spikes 4.16 of the lower chain conveyor 4.10 extending vertically upwards. The planes of rotation and the mountings of the chain conveyors 4.9, 4.10 are selected such that the spikes 4.15 on the working run of the upper chain conveyor 4.9 are directed towards the lower region of the sliding guide 4.5 and spaced from the same, and the working run of the lower chain conveyor 4.10 runs immediately adjacent the guide element 4.2 with its spikes 4.16 projecting into the gap 4.3. The auxiliary conveyor 4.8 is furthermore associated with the guide system in such a manner that the knife blade 4.6 lies in the region of the working runs of the upper and lower chain conveyors 4.9, 4.10.

The above-described apparatus part of the second processing device 4 is preferably arranged to pivot about the axis of the driving wheels 4.11 and 4.12 into the path of the poultry bodies against the force of a a non-shown resilient element such as a spring, so that the apparatus part is able automatically to adapt to the wing length of each poultry body.

After cutting off the wing tip members 5.4, the poultry body, still mounted on the saddle 2, is advanced by the conveyor 1 into the vicinity of the second processing device 4, where the wing 5.1 is guided up the ramp guide 4.4 into the gap 4.3 between the lower and upper guide elements 4.1, 4.2 so that the upper wing member 5.2 is guided close to the body. At this point, the wing 5.1 is supported by the elbow joint 5.6 formed between the lower and upper wing members 5.3, 5.2 and the lower wing member 5.3 is thus pushed upright. In this position, the lower wing member 5.3 reaches the operating region of the upper chain conveyor 4.9, and is engaged by the spikes 4.15 and held pressed against the sliding guide 4.5 as the upper chain conveyor 4.9 moves together with the advancing poultry body 5. Simultaneously, the lower chain conveyor 4.10 engages the upper wing 5.2 just above the elbow joint 5.6 with the spikes 4.16, so that the wing 5.1 is guided against the knife blade 4.6 while held on either side of the elbow joint 5.6. The knife blade 4.6 then "anatomically" severs the lower wing 5.3 from the poultry body by cutting from the crook of the elbow joint 5.6 outwards. The lower wing member 5.3 can then be discarded at any desired point along the chain conveyor 4.9 by means of an appropriately designed sliding face 4.5.

We claim:

1. An apparatus for cutting up the wings of poultry bodies into their component parts of a wing tip member, a lower wing member and an upper wing member, comprising conveying means for advancing the poultry bodies in their plane of symmetry with the wings located on either side along a path, guiding means arranged on each side of the conveying means for guiding the wings, auxiliary conveying means arranged on either side of the conveying means for supporting the wings during the cutting, and severing means for carrying out severing cuts in region of joints located in the wings, wherein said auxiliary conveying means, comprise a forked entrainer which is adapted to follow the movement of the advanced poultry body, engage a wing in the region, of a wing tip joint and guide the wing against said severing means in a predetermined orientation.

2. An apparatus as claimed in claim 1, wherein said conveying means comprise a saddle conveyor adapted to receive the poultry bodies in the form of front halves, the saddles being arranged to support the front halves from within the breast cavity.

3. An apparatus as claimed in claim 1, wherein said entrainer is connected to a pivot lever and adapted to pivot synchronously with the advanced poultry body into engagement with the wing tip joint and to pivot out of the path of the wings after the severing cut has been carried out.

4. An apparatus as claimed in claim 1, wherein said severing means is a circular knife, which is driven to rotate in a plane lying essentially perpendicular to the plane of symmetry of the poultry body and wherein said entrainer is arranged in its active position to cooperate with the circular knife such that an upper side of said entrainer is guided directly below the cutting plane of said circular knife.

5. An apparatus as claimed in claim 1, wherein a supporting guide is associated with said circular knife for pressing the upper wing member against the underside of said entrainer.

6. An apparatus as claimed in claim 1, in particular for severing the lower wing member from a poultry body, wherein said auxiliary conveying means is an endless conveyor adapted to synchronously accompany the advanced poultry body, to positively engage the upper and lower wing members and to guide the upper and lower wing members essentially at right angles to each other and perpendicular to the path of the conveying means.

7. An apparatus as claimed in claim 6, wherein said endless conveyor comprises an upper and lower chain conveyor having spikes for engaging the upper and lower wing portions, respectively, the spikes of the upper chain conveyor being arranged to extend essentially perpendicularly to the spikes of the lower chain conveyor.

8. An apparatus as claimed in claim 7, comprising an essentially flat sliding guide arranged adjacent, and spaced by a gap, from said upper chain conveyor for engaging and conveying the lower wing member.

9. An apparatus as claimed in claim 8 wherein an edge of said sliding guide is formed as a guide element adapted for engaging and conveying the upper wing member and arranged to face said lower chain conveyor but separated from said lower chain conveyor by a gap.

10. An apparatus as claimed in claim 9 wherein said guide element is provided with a knife blade, which is arranged at an angle adapted to essentially divide the angle between the lower and upper wing members in half, the outer edge of said knife blade being formed as a cutting edge which diverges with respect to said guide element when viewed in the conveying direction.

11. An apparatus as claimed in claim 6, wherein at least the spacing between the auxiliary conveying means arranged one side of the conveying means and the auxiliary conveying means arranged on the other side of the conveying means is adjustable against spring force.

12. An apparatus as claimed in claim 1, wherein the apparatus is adapted for integration in a processing line for filleting the breast meat of poultry.

* * * * *